(12) United States Patent
Dhupar et al.

(10) Patent No.: US 7,146,516 B2
(45) Date of Patent: Dec. 5, 2006

(54) TIME SYNCHRONIZATION SCHEMES WHEREIN AT LEAST ONE DATA MESSAGE ASSOCIATES A HARDWARE PULSE WITH A FUTURE TIME

(75) Inventors: Krishan Dhupar, North Attleboro, MA (US); Alan Gale, Carver, MA (US); Alan M. Foskett, Mansfield, MA (US); Marie Deconto-Thomas, Forestdale, MA (US)

(73) Assignee: Invensys Systems, Inc., Foxboro, MA (US)

(*) Notice: Subject to any disclaimer, the term of this patent is extended or adjusted under 35 U.S.C. 154(b) by 573 days.

(21) Appl. No.: 10/324,842

(22) Filed: Dec. 20, 2002

(65) Prior Publication Data

US 2004/0123174 A1 Jun. 24, 2004

(51) Int. Cl.
G06F 1/12 (2006.01)
H04J 3/06 (2006.01)

(52) U.S. Cl. .................. 713/400; 713/401; 370/350

(58) Field of Classification Search ........... 713/400, 713/401, 502; 455/255; 342/357.06; 370/350
See application file for complete search history.

(56) References Cited

U.S. PATENT DOCUMENTS

| | | | | |
|---|---|---|---|---|
| 5,748,941 A | * | 5/1998 | Rabjohns | 713/400 |
| 6,678,510 B1 | * | 1/2004 | Syrjarinne et al. | 455/255 |
| 6,683,867 B1 | * | 1/2004 | DeWulf | 370/350 |
| 6,693,592 B1 | * | 2/2004 | Dowdle et al. | 342/453 |

FOREIGN PATENT DOCUMENTS

DE 4427007 A1 * 2/1996

* cited by examiner

*Primary Examiner*—Thomas Lee
*Assistant Examiner*—Suresh K Suryawanshi
(74) *Attorney, Agent, or Firm*—Foley Hoag LLP

(57) ABSTRACT

Schemes for synchronizing networked stations using data messages and hardware pulses are described herein. In one embodiment, a method to provide time data from a first processor to at least one second processor may include transmitting a data message from the first processor to the at least one second processor, in which the data message associates a hardware pulse with a future time, and transmitting a hardware pulse from the first processor to the at least one second processor at the future time.

37 Claims, 3 Drawing Sheets

TIME SYNCHRONIZATION SCHEMES WHEREIN AT LEAST ONE DATA MESSAGE ASSOCIATES A HARDWARE PULSE WITH A FUTURE TIME

BACKGROUND (1) Field

The present disclosure relates to schemes for synchronizing networked stations using a combination of data messages and hardware pulses.

(2) Description of Related Art

A variety of schemes for synchronizing networked stations are presently available. For example, Network Time Protocol (NTP) synchronization schemes may be used to synchronize networked stations. Many of these schemes are based on transmitting data messages from a master station to networked slave stations, where the data messages include synchronization time data. These schemes may be adversely affected by network message propagation delay(s), thereby inhibiting their utility.

SUMMARY

Schemes for synchronizing networked stations using a combination of data messages and hardware pulses are described herein.

A method to provide time data from a first processor to at least one second processor is described herein. In one embodiment, the method may include transmitting a data message from the first processor to the at least one second processor, in which the data message associates a hardware pulse with a future time, and transmitting a hardware pulse from the first processor to the at least one second processor at the future time.

In one aspect, transmitting a data message may include transmitting a data message that associates a hardware pulse with a future time and a known hardware pulse propagation delay. Transmitting a data message may further include determining the known hardware pulse propagation delay.

In one aspect, transmitting a data message may include multicasting the data message from the first processor to the at least one second processor.

In one aspect, transmitting a hardware pulse may include converting the hardware pulse to a fiber-optic signal and transmitting the fiber-optic signal.

In one aspect, transmitting a hardware pulse may include multicasting the hardware pulse from the first processor to the at least one second processor.

In one embodiment, the method may further include adjusting at least one second processor clock based on the future time.

In one embodiment, the method may further include adjusting at least one second processor clock based on the future time and a known hardware pulse propagation delay.

In one embodiment, the method may further include receiving time data at the first processor. In one aspect, receiving may include receiving time data from one of a first processor clock, a global positioning system (GPS) receiver, and a radio timecode receiver.

In one embodiment, the method may further include transmitting a second data message from the first processor to the at least one second processor, in which the second data message associates at least one second hardware pulse with a periodic interval, and transmitting at least one second hardware pulse from the first processor to the at least one second processor at the periodic interval.

In one embodiment, the method may further include adjusting at least one second processor clock based on the periodic interval. In one aspect, adjusting may include incrementally adjusting at least one second processor clock during at least two periodic intervals.

A method to receive time data from a first processor is described herein. In one embodiment, the method may include receiving a data message from the first processor that associates a hardware pulse with a future time, receiving a hardware pulse from the first processor, and associating the hardware pulse with the future time.

In one aspect, receiving a data message may include receiving a data message that associates a hardware pulse with a future time and a known hardware pulse propagation delay. Associating may further include associating the hardware pulse with the future time and the known hardware pulse propagation delay.

In one aspect, receiving a hardware pulse may include receiving a fiber-optic signal.

In one embodiment, the method may further include adjusting at least one second processor clock based on the future time.

In one embodiment, the method may further include adjusting at least one second processor clock based on the future time and a known hardware pulse propagation delay. Adjusting may further include determining the known hardware pulse propagation delay.

In one embodiment, the method may further include receiving a second data message from the first processor that associates at least one second hardware pulse with a periodic interval, receiving at least one second hardware pulse from the first processor, and associating the at least one second hardware pulse with the periodic interval.

In one embodiment, the method may further include adjusting at least one second processor clock based on the periodic interval. In one aspect, adjusting may include incrementally adjusting the at least one second processor clock during at least two periodic intervals.

A method to provide time data from a first processor to at least one second processor is described herein. In one embodiment, the method may include transmitting a data message from the first processor to the at least one second processor, in which the data message associates a first hardware pulse with a future time and at least one second hardware pulse with a periodic interval; transmitting a first hardware pulse from the first processor to the at least one second processor at the future time; and, transmitting at least one second hardware pulse from the first processor to the at least one second processor at the periodic interval.

In one embodiment, the method may further include adjusting at least one second processor clock based on at least one of the future time and the periodic interval.

A method to receive time data from a first processor is described herein. In one embodiment, the method may include receiving a data message from the first processor that associates a first hardware pulse with a future time and at least one second hardware pulse with a periodic interval; receiving a first hardware pulse from the first processor; associating the first hardware pulse with the future time; receiving at least one second hardware pulse from the first processor; and, associating the at least one second hardware pulse with the periodic interval.

In one embodiment, the method may further include adjusting at least one second processor clock based on at least one of the future time and the periodic interval.

A method to provide time data from a first processor to at least one second processor is described herein. In one embodiment, the method may include transmitting a data message from the first processor to the at least one second processor, in which the data message associates a fiber-optic signal with a future time; and, transmitting a fiber-optic signal from the first processor to the at least one second processor at the future time.

In one aspect, transmitting a fiber-optic signal may include converting a hardware pulse to a fiber-optic signal.

A method to receive time data from a first processor is described herein. In one embodiment, the method may include receiving a data message from the first processor that associates a fiber-optic signal with a future time; receiving a fiber-optic signal from the first processor; and, associating the fiber-optic signal with the future time.

In one aspect, receiving a fiber-optic signal may include converting the fiber-optic signal to one of a hardware pulse and a data message.

A system to provide time data from a first processor to at least one second processor is described herein. In one embodiment, the system may include a first processor that includes a first clock, a first timekeeper for transmitting a data message to the at least one second processor, the data message associating a hardware pulse with a future time, and a pulse generator associated with the first processor, the pulse generator transmitting a hardware pulse to the at least one second processor at the future time.

In one aspect, the first timekeeper may be capable of multicasting the data message to the at least one second processor.

In one aspect, the pulse generator may be capable of multicasting the hardware pulse from the first processor to the at least one second processor.

In one aspect, the first timekeeper may be capable of receiving time data.

In one aspect, the first timekeeper may be capable of receiving time data from one of the first clock, a global positioning system (GPS) receiver, and a radio timecode receiver.

A system to receive time data from a first processor is described herein. In one embodiment, the system may include a second processor that includes a second clock and a second timekeeper for receiving a data message that associates a hardware pulse with a future time, receiving a hardware pulse, and associating the hardware pulse with the future time.

In one aspect, the second timekeeper may be capable of adjusting the second clock based on the future time.

These and other features of the schemes for synchronizing networked stations described herein may be more fully understood by referring to the following detailed description and accompanying drawings.

DETAILED DESCRIPTION

Figure 1:
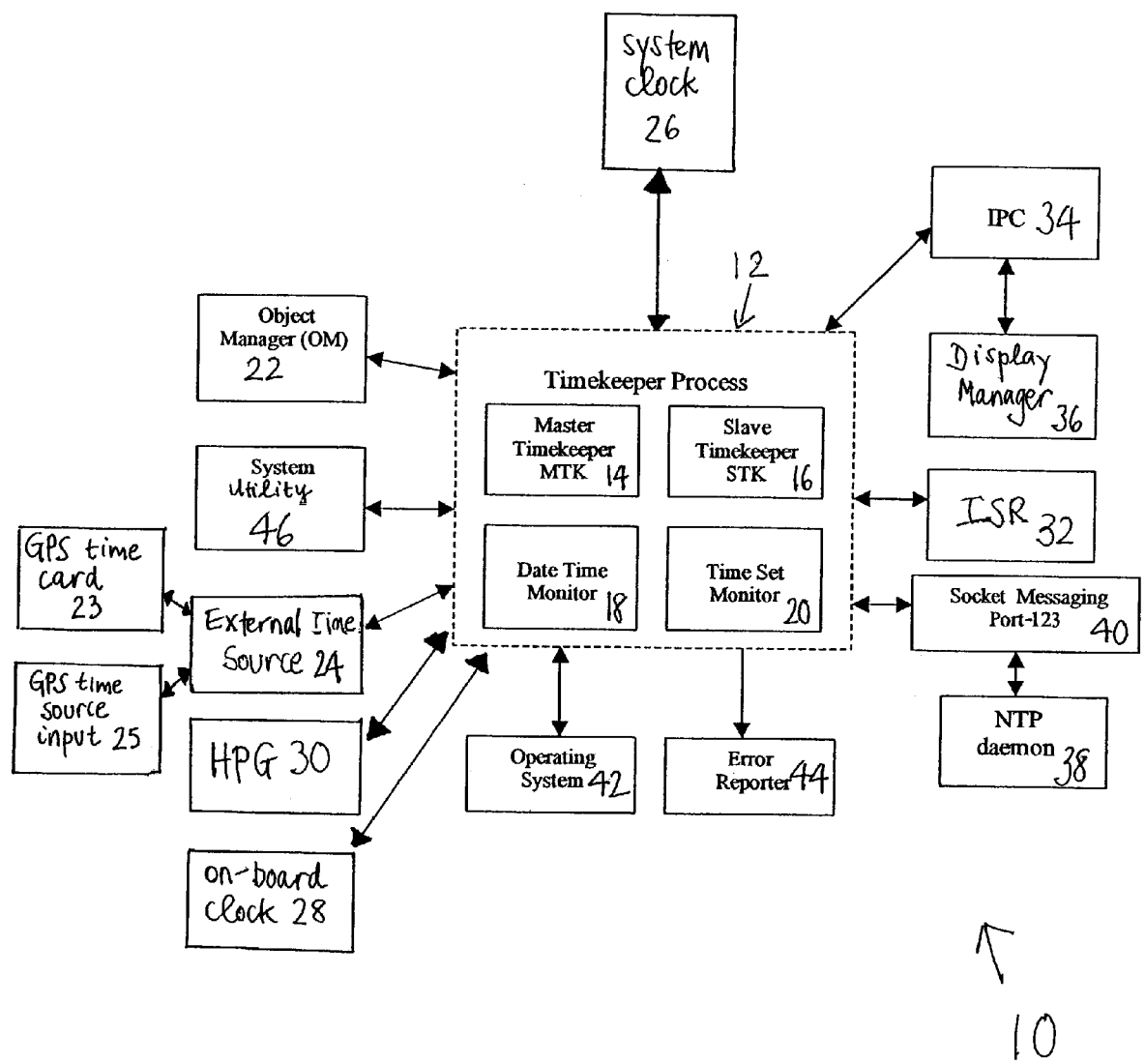
FIG. 1 illustrates exemplary components of a station capable of being synchronized according to schemes described herein.

Certain exemplary embodiments will now be described to provide an overall understanding of the schemes for time synchronization described herein. One or more examples of the exemplary embodiments are shown in the drawings. Those of ordinary skill in the art will understand that the schemes for time synchronization described herein can be adapted and modified to provide devices, methods, schemes, and systems for other applications, and that other additions and modifications can be made to the schemes described herein without departing from the scope of the present disclosure. For example, components, features, modules, and/or aspects of the exemplary embodiments can be combined, separated, interchanged, and/or rearranged to generate other embodiments. Such modifications and variations are intended to be included within the scope of the present disclosure.

Generally, in the exemplary synchronization schemes described herein, a master station may transmit data messages and hardware pulses to synchronize slave station(s) to the master station. In one embodiment, the master station may transmit a data message associating a hardware pulse with a future time to the slave station(s). The slave station(s) may receive the data message and may associate the hardware pulse with the future time. At the future time, the master station may transmit a hardware pulse to the slave station(s). The slave station(s) may receive the hardware pulse and may adjust slave clock(s) based on the future time, thereby synchronizing the slave station(s) to the master station.

In the following description, references are made to a master processor and one or more slave processor(s). Those of ordinary skill in the art will understand that the terms "master" and "slave" are relative and should not be interpreted to imply a processor relationship other than that described herein.

FIG. 1 illustrates exemplary components of a station capable of being synchronized according to schemes described herein. As shown in FIG. 1, the station 10 may include a timekeeper process (TKP) 12 for maintaining time on the station 10. The TKP 12 may include a master timekeeper (MTK) component 14, a slave timekeeper (STK) component 16, a date/time monitor 18, and a time set monitor 20. The MTK component 14 and the STK component 16 may include at least two states of operation, such as an active state and a standby state. Generally, at a particular time, the MTK component 14 and the STK component 16 can operate in different states. For example, at a particular time, the MTK component 14 may operate in an active state, and the STK component 16 may operate in a standby state. The date/time monitor 18 may be used to monitor a clock associated with the station 10 and transmit data messages to other stations. The time set monitor 20 may be used to adjust a clock associated with the station 10. Those of ordinary skill in the art will recognize that the components of the TKP 12 may communicate among the illustrated components 14, 16, 18, 20 and/or other components that are not illustrated.

The TKP 12 may interface with a variety of station components for communicating time on the station 10. As shown in FIG. 1, the TKP 12 may communicate and/or interface with an external time source 24, at least one internal time source 26, 28, and a hardware pulse generator (HPG) 30. As shown in FIG. 1, the TKP 12 can also interface with an NTP daemon 38.

The external time source 24 may include a hardware device that can establish time according to an international standard. In one embodiment, the external time source 24 may include a global positioning system (GPS) receiver or another system for receiving time data from one or more satellites. For example, as shown in FIG. 1, the external time source 24 may include a GPS time card 23 and a GPS time source input 25 for receiving time data. In one embodiment, the external time source 24 may include an interpreter that can receive a radio timecode signal, such as an IRIG-A, an IRIG-B, and/or a NASA36 signal. Generally, the external time source 24 may include a GPS receiver, and/or a timecode interpreter, and/or another device.

In the illustrated embodiments, the external time source 24 can establish time in coordinated universal time (UTC) format. Although the illustrated embodiments may be described relative to UTC format, those of ordinary skill in the art will recognize that the schemes described herein are not limited to UTC format, and that the schemes described herein can use non-UTC formats, e.g. Greenwich Mean Time (GMT), Eastern Standard Time (EST), and Pacific Standard Time (PST), without departing from the scope of the present disclosure.

Accordingly, with reference to FIG. 1, the UTC time from the illustrated external time source 24 may be converted to another format, such as local time, by the TKP 12 based on information provided by a user, such as a time zone that can be a local time zone.

The at least one internal time source 26, 28 may include a processor clock associated with the station 10, such as system clock 26 and/or an on-board clock, such as a clock 28 associated with the external time source 24.

The HPG 30 can generate a hardware pulse for transmission to stations connected to the station 10. In one embodiment, the HPG 30 may reside on the plug-in board of the external time source 24. For example, the HPG 30 may be included on a plug-in board associated with a GPS receiver 24, although other configurations can be used. The HPG 30 can convert the hardware pulse to a form compatible with a serial data communications standard, such as, for example, RS-422, RS-485, and other standards for external transmission. In one embodiment, the HPG 30 may include a fiber-optic signal converter and may convert the hardware pulse to a fiber-optic signal for transmission on fiber-optic cable(s).

The TKP 12 may interface with an interrupt service routine (ISR) 32 for receiving a hardware pulse from an HPG. In one embodiment, the TKP 12 may include a fiber-optic signal converter for converting a fiber-optic signal from an HPG to a data message or a hardware pulse.

The illustrated NTP daemon 38 may provide NTP synchronization data according to NTP schemes. The NTP daemon 38 may interface with the TKP 12 via, for example, a Socket Messaging Port-123 40, although other input/output ports can be used.

The TKP 12 may communicate and/or interface with a variety of components for communicating with other TKPs. As shown in FIG. 1, the TKP 12 may interface with one or more object managers (OM) 22, one or more-interprocess communicators (IPC) 34, one or more operating systems (OS) 42, one or more error reporters 44, and one or more system utilities 46.

The OM 22 may manage variables that contain information about the station 10. For example, the illustrated MTK and STK components 14, 16 may provide status data to the illustrated OM 22 to communicate their respective state(s) of operation. The OM 22 can communicate the status data to other stations using, for example, IPC 34. In one embodiment, the IPC 34 may include software that provides a communications service application programming interface (API). The IPC 34 may include addresses for other stations, such as Internet Protocol (IP) addresses and/or other addresses and/or station location identifiers.

The OS 42 may include an operating system, such as Windows XP, Solaris 2.8, Nucleus Plus, and Windows CE.NET, although other operating systems can be used. The TKP 12 may interact with the OS 42 to access data files, a system clock 26, and an on-board clock 28.

The error reporter 44 can generate error data and error messages based on one or more error conditions. For example, the error reporter 44 may generate an error message based on a failure of the external time source 24, the HPG 30, the NTP daemon 38, and/or another component. The error reporter 44 can transmit error messages to other stations.

The system utility 46 can install software and APIs for use by the TKP 12. For example, the system utility 46 can install software and APIs for the external time source 24 and the NTP daemon 38.

The TKP 12 may also interface with a display manager 36. Generally, the display manager 36 may allow a user to interact with the TKP 12. In one embodiment, the time set monitor 20 and the display manager 36 may allow a user to adjust, manually and/or via hardware and/or software, an internal time source, such as the system clock 26 and/or the on-board clock 28. As described herein, the time set monitor 20 and the display manager 36 may transmit a time and/or date message to other stations via the IPC 34 based on an adjustment of an internal time source, e.g. system clock 26 and/or on-board clock 28.

Figure 2:
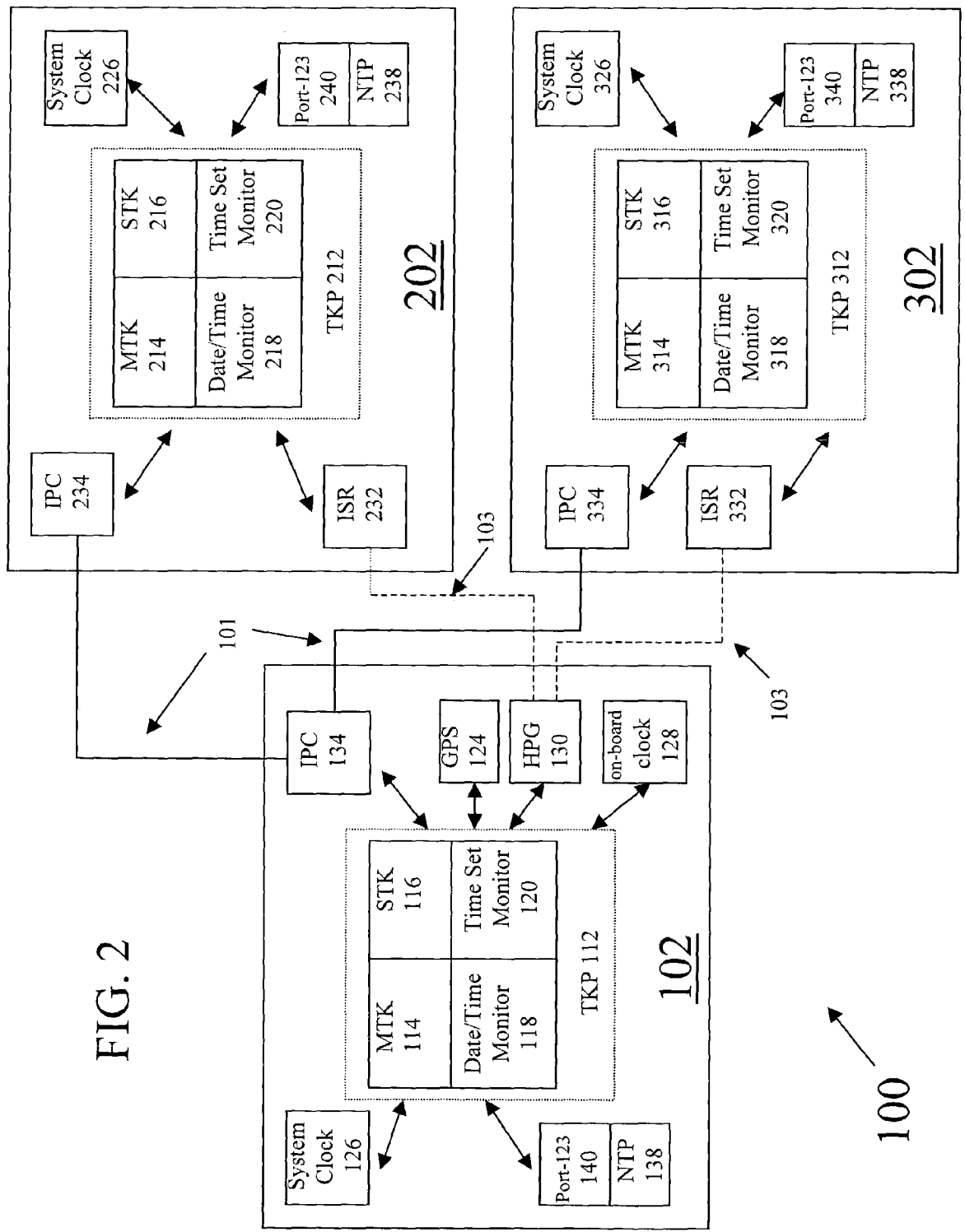
FIG. 2 illustrates an exemplary synchronization scheme including stations similar to those shown in FIG. 1.

FIG. 2 illustrates an exemplary synchronization scheme. The synchronization scheme 100 may include networked stations 102, 202, 302 having components similar to those shown in FIG. 1.

Generally, at a particular time, an MTK component associated with one station, a master station, can operate in an active state, while MTK components associated with other stations, referred to as slave stations, can operate in standby states. In such a configuration, the slave stations can be synchronized to the master station.

Accordingly, FIG. 2 shows an exemplary synchronization scheme 100 that includes a master station 102 having an active MTK component 114, a standby STK component 116, a GPS receiver 124, and a HPG 130. The synchronization scheme 100 may include slave stations 202, 302 having standby MTK components 214, 314, active STK components 216, 316, and ISRs 232, 332, respectively. The master station 102 and slave stations 202, 302 may include other components similar to those shown in FIG. 1. The master station 102 may synchronize slave stations 202, 302 according to schemes described herein.

The exemplary synchronization scheme 100 may include a first communication link 101 capable of transmitting data messages and a second communication link 103 capable of transmitting hardware pulses. The communication links 101, 103 can include one or more networked links. The first communication link 101 may employ, for example, Ethernet technology or another network technology. The second communication link 103 may include a link based on, for example, RS-422, RS-485, or another serial communications standard for external transmission. In one embodiment, the second communication link 103 may be based on a fiber-optic communications standard. The stations 102, 202, 302 may include fiber-optic connector(s) for connecting to fiber-optic cable(s) and fiber-optic signal converter(s) for converting a fiber-optic signal to a hardware pulse.

The exemplary synchronization scheme 100 may be understood in the following manner with reference to FIG. 2. At the master station 102, the GPS receiver 124 may receive time data from one or more satellites and may synchronize its on-board clock 128 to the time. The date/time monitor 118 may retrieve the time data from the GPS receiver 124 via an API. Based on the time data, the date/time monitor 118 may determine a future time for transmitting a hardware pulse. The date/time monitor 118 may generate a data message that associates a hardware pulse with the future time. The date/time monitor 118 may multicast or otherwise transmit the data message to slave stations 202, 302 via IPC 134.

In one embodiment, the time set monitor 120 may use the time data to synchronize system clock 126 with on-board clock 128 to provide a backup time source, for example, in the event of failure of GPS receiver 124.

At a slave station, such as slave station 202, the active STK component 216 may employ IPC 234 to detect the data message from the active MTK component 114. The received data message can cause STK component 216 to store the associated future time for use by the ISR 232 or another module for adjusting system clock 226.

At the master station 102, the HPG 130 may transmit a hardware pulse to the slave stations 202, 302 at the future time specified in the data message. The HPG 130 may transmit the hardware pulse based on receiving an instruction from the date/time monitor 118. In one embodiment, the HPG 130 may be hardcoded to transmit a hardware pulse at a particular time. The HPG 130 may multicast or otherwise transmit the hardware pulse to the slave stations 202, 302 over second communication link 103. In one embodiment, the HPG 130 may include a fiber-optic signal converter and may convert a hardware pulse to a fiber-optic signal for transmission over a second communication link 103 including fiber-optic cable(s).

At slave station 202, receipt of the hardware pulse may cause ISR 232 to process the hardware pulse. The ISR 232 may associate the hardware pulse with the stored future time, and the ISR 232 may adjust the system clock 226 based on the future time. In one embodiment, as previously indicated, the ISR 232 may prompt another module to process the hardware pulse.

In one embodiment, the ISR 232 may be designed to process a fiber-optic signal. As previously indicated, the HPG 130 may convert the hardware pulse to a fiber-optic signal for transmission on fiber-optic cable(s). Receipt of the fiber-optic signal may cause ISR 232 to associate the fiber-optic signal with the stored future time and adjust the system clock 226 based on the future time. In one embodiment, ISR 232 and/or another component of slave station 202 may include a fiber-optic signal converter for converting a fiber-optic signal from HPG 130 to a data message, a hardware pulse, or another signal for processing by ISR 232.

The exemplary synchronization scheme 100 may be modified to compensate for a fixed or otherwise known propagation delay of the hardware pulse. A known propagation delay may be calculated, measured, or otherwise determined based on a variety of physical parameters, including, for example, length(s) of transmission cable(s), a number of repeaters, and other physical parameters. In one embodiment, a known propagation delay may be calculated and stored on STK component 216 for use by ISR 232. During processing of a hardware pulse, ISR 232 may associate the hardware pulse with a stored future time and the stored delay and may adjust the system clock 226 based on the future time and the delay. In one embodiment, a known propagation delay may be calculated and stored on MTK component 114 for use by date/time monitor 118. The date/time monitor 118 may determine a future time for transmitting a hardware pulse and may generate a data message that associates a hardware pulse with the future time and the stored delay. The date/time monitor 118 and/or the ISR 232 may be hardcoded with a known propagation delay. In one embodiment, re-calculations, measurements, or determinations of the propagation delay can be performed.

The exemplary synchronization scheme 100 may be performed at intervals to maintain synchronization between networked stations. For example, master station 102 may transmit updated data messages and corresponding hardware pulses to slave stations 202, 302, and slave stations 202, 302 may update their respective system clocks 226, 326 based on the future times included in the updated data messages. The master station 102 may regularly or periodically transmit updated data messages and corresponding hardware pulses.

Based on the drift specifications of system clocks 226, 326 and other factors, respective slave stations 202, 302 may drift between updates. To reduce drift between updates, master station 102 may periodically transmit hardware pulses to slave stations 202, 302, as described herein.

An exemplary synchronization scheme for reducing drift may be understood in the following manner with reference to FIG. 2. At the master station 102, the date/time monitor 118 may transmit a data message to slave stations 202, 302 associating consecutive hardware pulses with a periodic interval. This data message may be transmitted separately from the data message associating a hardware pulse with a future time. In one embodiment, this data message may be part of the data message associating a hardware pulse with a future time. For example, the master station 102 may transmit a data message associating a first hardware pulse with a future time and associating at least one second hardware pulse with a periodic interval. In one embodiment, the TKPs 212, 312 at the respective slave stations 202, 302 may be hardcoded with the periodic interval. The date/time monitor 118 may instruct the HPG 130 to transmit a hardware pulse to the slave stations 202, 302 at the periodic interval. In one embodiment, the HPG 130 may be hardcoded to transmit a hardware pulse at the periodic interval.

The slave stations 202, 302 may process hardware pulses based on schemes similar to those described herein. For example, in one embodiment, an active STK component 216 may employ IPC 234 to detect a data message from master station 102. Receipt of a data message can cause the active STK component 216 to store the periodic interval for use by the ISR 232. Receipt of consecutive hardware pulses can cause the ISR 232 to associate the hardware pulses with the periodic interval, and the ISR 232 may adjust the system clock 226 based on the periodic interval.

Generally, master station 102 may periodically transmit data messages and hardware pulses to slave stations 202, 302, and slave stations 202, 302 may adjust their respective system clocks 226, 326 based on the future time or the periodic interval, and also based on whether a hardware pulse is preceded by a data message associating a hardware pulse with a future time.

In one exemplary embodiment, the master station 102 may transmit hardware pulses at a period of five seconds and data messages associating a hardware pulse with a future time at a period of 60 seconds. In such an embodiment, slave stations 202, 302 may be synchronized to a tolerance of less than approximately one millisecond, provided that respective system clocks 226, 326 have drift specifications less than approximately 0.1 millisecond/second.

Slave stations 202, 302 may perform several time sensitive operations during a synchronization cycle, where a synchronization cycle may refer to a cycle for processing a hardware pulse based on a future time or a periodic interval. Due to ISR processing limitations, a slave station may adjust a system clock in increments of approximately one millisecond or less per synchronization cycle. As such, slave stations 202, 302 may react to a difference between the time source on the master station 102, such as GPS receiver 124, and the respective system clocks 226, 326 by incrementally adjusting the system clocks 226, 326 over several synchronization cycles.

As previously described, master station 102 may implement exemplary synchronization scheme 100 to synchronize slave stations 202, 302 to an external time source, such as time established by GPS receiver 124. In one embodiment, master station 102 may implement exemplary synchronization scheme 100 to synchronize slave stations 202, 302 to an internal time source, such as system clock 126 and/or on-board clock 128. Master station 102 may synchronize slave stations 202, 302 to an internal time source when an external time source becomes unavailable. An external time source may become unavailable based on a hardware failure or other event. For example, GPS receiver 124 may fail or may be unable to provide time data. Since an internal time source may drift from an external source that provides absolute time, networked stations that are synchronized to the internal source may not include accurate absolute time.

An exemplary scheme for synchronizing networked stations to an internal time source on failure of an external time source may be understood in the following manner with reference to FIG. 2. At master station 102, on failure of GPS receiver 124, time set monitor 120 may determine whether the system clock 126 and/or the on-board clock 128 had been previously synchronized to the external time source 124. For example, as previously indicated, GPS receiver 124 may have synchronized on-board clock 128 to UTC time, time set monitor 120 may have synchronized system clock 126 with on-board clock 128, and/or a user may have provided a time for system clock 126. If system clock 126 and/or on-board clock 128 had been previously synchronized, time set monitor 120 may multicast or otherwise transmit a message via IPC 134 to slave stations 202, 302 indicating the new time source, i.e. system clock 126 or on-board clock 128. Synchronization may proceed according to schemes previously described. If neither clock had been synchronized, however, time set monitor 120 may prompt a user via display manager 136 to set system clock 126. TKP 112 may convert the time provided by the user to UTC time, and may transmit or multicast the new time in a data message via IPC 134 to slave stations 202, 302. Slave stations 202, 302 may adjust their respective system clocks 226, 326 based on the data message. Synchronization may proceed according to schemes previously described.

As previously described, master station 102 may synchronize slave stations 202, 302 by implementing exemplary synchronization scheme 100. Master station 102 may also synchronize slave stations 202, 302 by implementing a NTP synchronization scheme. In one embodiment, master station 102 may implement a NTP synchronization scheme in the event that an exemplary synchronization scheme described herein becomes unavailable due to, for example, a failure of: a second communication link 103; at a slave station, an ISR; and/or at master station 102, an HPG 130. Generally, a NTP synchronization scheme may be implemented concurrently with an exemplary synchronization scheme described herein. For example, master station 102 may implement an NTP synchronization scheme to synchronize stations incapable of receiving hardware pulses and may concurrently implement synchronization scheme 100 to synchronize other stations. Generally, TKPs may determine a suitable synchronization scheme based on information contained in OM shared variables.

An exemplary scheme for synchronizing networked stations using NTP may be understood in the following manner with reference to FIG. 2. As shown in FIG. 2, master station 102 and slave stations 202, 302 may include NTP daemons 138, 238, 338, respectively. NTP daemon 138 may be configured by TKP 112 to be a server daemon or a time source and NTP daemons 238, 338 may be configured by respective TKPs 212, 312 to be clients of NTP daemon 138. NTP server daemon 138 may be configured to refer to an internal time source, such as system clock 126 or on-board clock 128. TKPs 112, 212, 312 may monitor respective NTP daemons 138, 238, 338 via socket messaging, although other monitoring configurations are possible. Generally, on failure of an exemplary synchronization scheme described herein, NTP server daemon 138 may use socket messaging to synchronize NTP client daemons 238, 338 based on a NTP scheme.

Generally, a standby TKP component may monitor the health or state of operation of an active TKP component and may become active on failure of the active TKP component. For example, at a station, a standby STK component may monitor the health of an active MTK component. Also, for networked stations, a standby MTK component at a slave station may monitor the health of the active MTK component at the master station. The health of a TKP component may be monitored based on, for example, OM shared variables and/or error messages provided by an error reporter. A system utility may determine whether a particular standby TKP component may become active.

A variety of backup synchronization schemes that allow a standby STK component on a slave station to assume responsibilities of an active MTK component on a master station are possible. Generally, a backup synchronization scheme may include a primary MTK component operating in an active state and at least one backup MTK component operating in a standby state. A backup synchronization scheme may also support a hierarchy providing an order of succession of the at least one backup MTK component. An order of succession can include a backup MTK component with an external time source and an HPG, a backup MTK component with an internal time source and an HPG, a backup MTK component with an external time source, and a backup MTK component with an internal time source. A backup synchronization scheme may support an exemplary synchronization scheme described herein, an NTP synchronization scheme, or a combination of both schemes.

Figure 3:
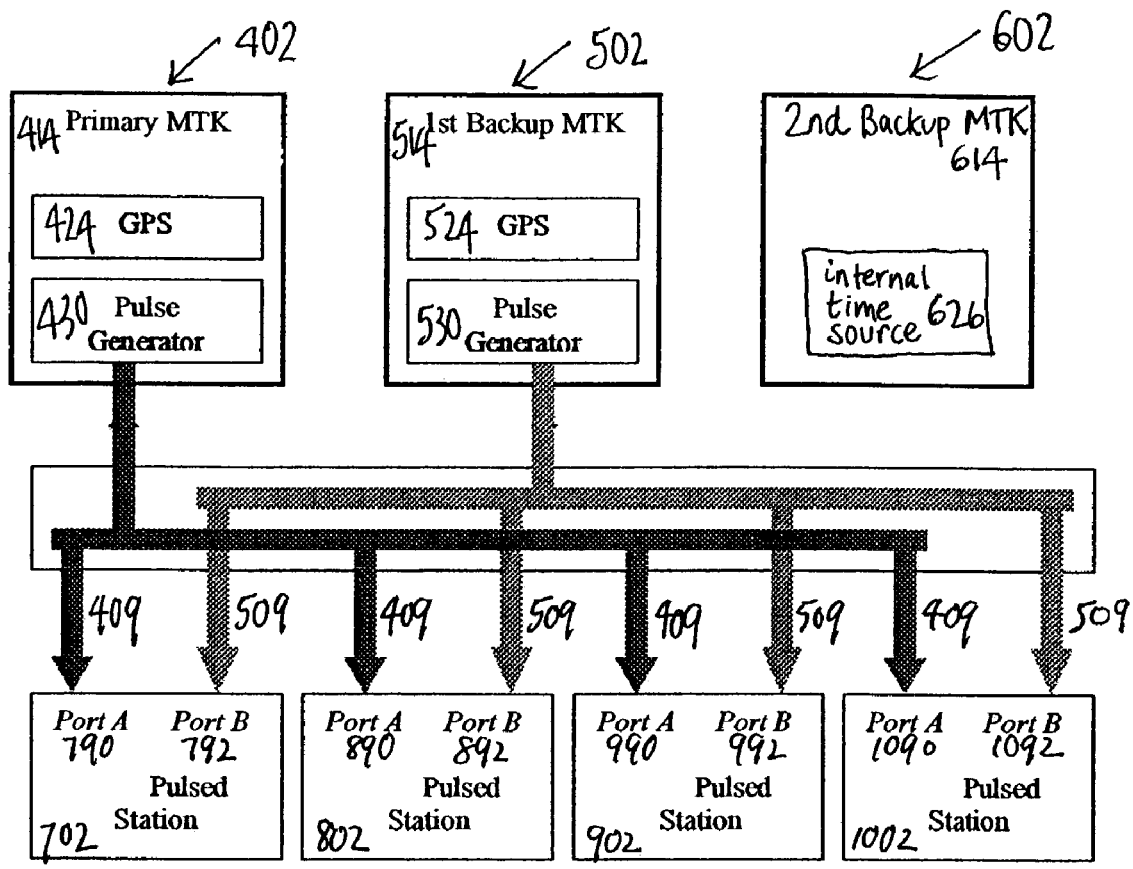
FIG. 3 illustrates an exemplary backup synchronization scheme including stations similar to those shown in FIG. 1.

FIG. 3 illustrates an exemplary backup synchronization scheme that allows a backup MTK component on a slave station to provide redundant timekeeping responsibilities for an active MTK component on a master station. The backup synchronization scheme 400 may include a master station 402 having a primary active MTK component 414, a GPS receiver 424, and a HPG 430; a first backup slave station 502 having a first backup MTK component 514, a GPS receiver 524, and a HPG 530; a second backup slave station 602 including a second backup MTK component 614 and an internal time source 626; and slave stations 702–1002. Stations 402–1002 may include components and communication links (not shown) similar to those shown in FIGS. 1 and 2. Generally, slave stations 702–1002 may include respective ports-A 790–1090 and ports-B 792–1092 for receiving hardware pulses and software for determining which port received a particular hardware pulse.

Operation of backup synchronization scheme 400 may be understood in the following manner. Primary MTK component 414 and first backup MTK component 514 may implement exemplary synchronization schemes described herein to synchronize slave stations 702–1002 to time established by respective GPS receivers 424, 524. As shown in FIG. 3A, primary MTK component 414 may provide hardware pulses 409 to ports-A 790–1090, while first backup MTK component 514 may provide hardware pulses 509 to ports-B 792–1092. During operation of primary MTK component 414, slave stations 702–1002 may adjust their system clocks based on pulses 409 received at respective ports-A 790–1090. On failure of primary MTK component 414, however, slave stations 702–1002 may adjust their system clocks based on pulses 509 received on respective ports-B 792–1092.

In one embodiment, on failure of one of a port-A and a port-B, a slave station may be reconfigured to receive hardware pulses from the primary active MTK component 414 on a non-failed port. In such an embodiment, the slave station may receive hardware pulses from the first backup MTK component 514 on the non-failed port on failure of the primary active MTK component 414.

In one embodiment, on failure of port-A and port-B, a slave station may be synchronized according to a NTP synchronization scheme.

Backup synchronization scheme 400 may permit the first backup MTK component 514 to assume at least some timekeeping responsibilities on failure of primary active MTK component 414. In one embodiment, the first backup MTK component 514 may assume timekeeping responsibilities on failure of master station 402, GPS receiver 424, and/or HPG 430. In one embodiment, primary active MTK component 414 and first backup MTK component 514 may share timekeeping responsibilities. For example, on failure of HPG 130, primary active MTK component 414 may continue to establish time and transmit data messages, and first backup MTK component 514 may transmit hardware pulses. In one embodiment, on failure of HPGs 430, 530, an MTK component associated with a non-failed GPS receiver may implement a NTP synchronization scheme to synchronize stations 702–1002 to time established by the GPS receiver. In one embodiment, on failure of GPS receivers 424 and 524, an MTK component associated with a non-failed HPG may implement an exemplary synchronization scheme described herein to synchronize stations 702–1002 to an internal time source.

Backup synchronization scheme 400 may also permit the second backup MTK component 614 to assume timekeeping responsibilities on failure of both primary active MTK component 414 and first backup MTK component 514. In one embodiment, on failure of GPS receivers 424, 524 and HPGs 430, 530, one of stations 402, 502, 602 may implement a NTP synchronization scheme to synchronize stations 702–1002 to an internal time source. In another embodiment, on failure of both master station 402 and first backup slave station 502, second backup MTK component 614 may implement a NTP synchronization scheme to synchronize stations 702–1002 to internal time source 626. Generally, a new master station may reconfigure its associated NTP daemon to become a server daemon, and slave stations may reconfigure their associated NTP daemons to become client daemons of the new server daemon.

Transfer of timekeeping responsibilities from a primary MTK component to a backup MTK component may affect the synchronization of networked stations. At least three transfer scenarios may be possible, specifically, (1) transfer from a primary MTK component having an external time source to a backup MTK component having another external time source, (2) transfer from a primary MTK component having an external time source to a backup MTK component having an internal time source, and (3) transfer from a primary MTK component having an internal time source to a backup MTK component having another internal time source. Generally, networked stations may experience a synchronization gap during these scenarios, where a synchronization gap can be understood to include a time interval during which slave stations may become out of synchronization with a master station. A synchronization gap may arise during a transfer of timekeeping responsibilities between MTK components because the time sources associated with the MTK components may provide different time data. For example, networked stations may experience a synchronization gap in scenario (2) because the internal time source associated with the backup MTK component may include a different time than the external time source associated with the primary MTK component. Such a time difference may occur because either the internal time source was not previously synchronized to the external time source or because the internal time source drifted after being synchronized. Generally, as previously described, a slave station may react to a synchronization gap by incrementally adjusting a system clock over several synchronization cycles. As such, during a transfer of timekeeping responsibilities between MTKs, networked stations may not be synchronized to a specified tolerance for a time interval.

The schemes described herein are not limited to a particular hardware or software configuration; they may find applicability in many computing or processing environments. The schemes can be implemented in hardware or software, or in a combination of hardware and software. The schemes can be implemented in one or more computer programs, in which a computer program can be understood to include one or more processor-executable instructions. The computer program(s) can execute on one or more programmable processors, and can be stored on one or more storage media readable by the processor, including volatile and non-volatile memory and/or storage elements. The programmable processor(s) can access one or more input devices to obtain input data and one or more output devices to communicate output data.

The computer program(s) can be implemented in high level procedural or object oriented programming language to communicate with a computer system. The computer program(s) can also be implemented in assembly or machine language. The language can be compiled or interpreted.

The computer program(s) can be stored on a storage medium or a device (e.g., compact disk (CD), digital video disk (DVD), magnetic disk, internal hard drive, external hard drive, random access memory (RAM), redundant array of independent disks (RAID), or removeable memory card) that is readable by a general or special purpose programmable computer for configuring and operating the computer when the storage medium or device is read by the computer to perform the schemes described herein.

While the schemes described herein have been particularly shown and described with reference to certain exemplary embodiments, those of ordinary skill in the art will understand that various changes may be made in the form and details of the schemes described herein without departing from the spirit and scope of the present disclosure.

For example, stations capable of being synchronized according to schemes described herein may include different components than those shown in FIGS. 1–3. Generally, the schemes described herein may be implemented on a network that includes at least one master clock; at least one master hardware pulse generator; at least one master processor capable of generating and transmitting a data message; and at least one slave processor capable of receiving a data message and a hardware pulse, processing the data message and hardware pulse, and adjusting at least one slave clock based on the hardware pulse and information contained in the data message.

Also, a backup synchronization scheme may include different components than those shown in FIGS. 1–3. Generally, a backup synchronization scheme may include at least one backup MTK component with an external time source and an HPG, and/or at least one backup MTK component with an internal time source and an HPG, and/or at least one backup MTK component with an external time source, and/or at least one backup MTK component with an internal source time, and/or a combination of the foregoing.

Those of ordinary skill in the art will recognize or be able to ascertain many equivalents to the exemplary embodiments described herein by using no more than routine experimentation. Such equivalents are intended to be encompassed by the scope of the present disclosure and the appended claims. Accordingly, the appended claims are not to be limited to the embodiments described herein, can include practices other than those specifically described, and are to be interpreted as broadly as allowed under prevailing law.

The invention claimed is:

1. A method to provide time data from a first processor to at least one second processor, the method comprising:
   transmitting at least one data message from the first processor to the at least one second processor, wherein the at least one data message associates a hardware pulse with a future time and with a periodic interval,
   transmitting a first hardware pulse from the first processor to the at least one second processor at the future time, and
   transmitting subsequent hardware pulses from the first processor to the at least one second processor at the periodic interval, wherein data message communications between the first processor and the at least one second processor are operable between the first hardware pulse and the subsequent hardware pulses and between the subsequent hardware pulses.

2. The method of claim 1, wherein transmitting a data message comprises:
   transmitting a data message, wherein the future time includes a known hardware pulse propagation delay between the first processor and the at least one second processor.

3. The method of claim 2, further comprising:
   determining the known hardware pulse propagation delay.

4. The method of claim 1, wherein transmitting a data message comprises:
   multicasting the data message from the first processor to the at least one second processor.

5. The method of claim 1, wherein transmitting a hardware pulse comprises:
   converting the hardware pulse to a fiber-optic signal, and transmitting the fiber-optic signal.

6. The method of claim 1, wherein transmitting a hardware pulse comprises:
   multicasting the hardware pulse from the first processor to the at least one second processor.

7. The method of claim 1, further comprising:
   adjusting at least one second processor clock based on the future time.

8. The method of claim 1, further comprising:
   adjusting at least one second processor clock based on the future time and a known hardware pulse propagation delay between the first processor and the at least one second processor.

9. The method of claim 1, further comprising:
   receiving time data at the first processor.

10. The method of claim 9, wherein receiving comprises:
    receiving time data from one of a first processor clock, a global positioning system (GPS) receiver, and a radio timecode receiver.

11. The method of claim 1, further comprising:
    adjusting at least one second processor clock based on the future time and receipt of the first hardware pulse at the at least one second processor, and
    reducing drift of the at least one second processor clock based on the periodic interval and receipt of the subsequent hardware pulses.

12. The method of claim 11, wherein adjusting at least one second processor clock further comprises:
    adjusting the at least one second processor clock based on a known hardware pulse propagation delay between the first processor and the at least one second processor.

13. The method of claim 12, wherein reducing drift comprises:
    incrementally adjusting the at least one second processor clock during at least two periodic intervals.

14. A method to receive time data from a first processor, the method comprising:
    receiving at least one data message from the first processor that associates a hardware pulse with a future time and with a periodic interval,
    receiving a first hardware pulse sent from the first processor at the future time,
    receiving subsequent hardware pulses from the first processor at the periodic interval, wherein data message communications from and to the first processor are operable between the first hardware pulse and the subsequent hardware pulses and between the subsequent hardware pulses, and
    associating the hardware pulse with the future time.

15. The method of claim 14, wherein receiving at least one data message comprises:
    receiving a data message, wherein the future time includes a known hardware pulse propagation delay in receiving the first hardware pulse.

16. The method of claim 14, wherein receiving a hardware pulse comprises:
    receiving a fiber-optic signal.

17. The method of claim 14, further comprising:
    adjusting at least one second processor clock based on the future time.

18. The method of claim 14, further comprising:
    adjusting at least one second processor clock based on the future time and a known hardware pulse propagation delay in receiving the first hardware pulse.

19. The method of claim 18, wherein adjusting comprises:
    determining the known hardware pulse propagation delay.

20. The method of claim 14, further comprising:
    adjusting at least one second processor clock based on the future time and receipt of the first hardware pulse, and
    reducing drift of the at least one second processor clock based on the periodic interval and receipt of the subsequent hardware pulses.

21. The method of claim 20, wherein adjusting at least one second processor clock further comprises:
adjusting the at least one second processor clock based on a known hardware pulse propagation delay between the first processor and the at least one second processor.

22. The method of claim 21, wherein reducing drift comprises:
incrementally adjusting the at least one second processor clock during at least two periodic intervals.

23. A method to provide time data from a first processor to at least one second processor, the method comprising:
transmitting a data message from the first processor to the at least one second processor, wherein the data message associates a first hardware pulse with a future time and at least one second hardware pulse with a periodic interval,
transmitting a first hardware pulse from the first processor to the at least one second processor at the future time, and
transmitting at least one second hardware pulse from the first processor to the at least one second processor at the periodic interval, wherein data message communications between the first processor and the at least one second processor are operable between the hardware pulses.

24. The method of claim 23, further comprising:
adjusting at least one second processor clock based on the future time and receipt of the first hardware pulse at the at least one second processor, and
reducing drift of the at least one second processor clock based on the periodic interval and receipt of the at least one second hardware pulse at the at least second processor.

25. A method to receive time data from a first processor, the method comprising:
receiving a data message from the first processor that associates a first hardware pulse with a future time and at least one second hardware pulse with a periodic interval,
receiving a first hardware pulse sent from the first processor at the future time,
associating the first hardware pulse with the future time,
receiving at least one second hardware pulse from the first processor, wherein data message communications between the first processor and the at least one second processor are operable between the hardware pulses, and
associating the at least one second hardware pulse with the periodic interval.

26. The method of claim 25, further comprising:
adjusting at least one second processor clock based on the future time and receipt of the first hardware pulse, and
reducing drift of the at least one second processor clock based on the periodic interval and receipt of the at least one second hardware pulse.

27. A method to provide time data from a first processor to at least one second processor, the method comprising:
transmitting a data message from the first processor to the at least one second processor, wherein the data message associates a fiber-optic signal with a future time,
transmitting a fiber-optic signal from the first processor to the at least one second processor at the future time, and
associating the future time with a known fiber-optic signal propagation delay between the first processor and the at least one second processor.

28. The method of claim 27, wherein transmitting a fiber-optic signal comprises:
converting a hardware pulse to a fiber-optic signal.

29. A method to receive time data from a first processor, the method comprising:
receiving a data message from the first processor that associates a fiber-optic signal with a future time,
receiving a fiber-optic signal sent from the first processor at the future time,
associating the fiber-optic signal with the future time, and
accounting for a known fiber-optic signal propagation delay between the first processor and the at least one second processor.

30. The method of claim 29, wherein receiving a fiber-optic signal comprises:
converting the fiber-optic signal to one of a hardware pulse and a data message.

31. A system to provide time data from a first processor to at least one second processor, the system comprising:
a first processor including
a first clock,
a first timekeeper for transmitting at least one data message to the at least one second processor, the at least one data message associating a hardware pulse with a future time and with a periodic interval, and
a pulse generator associated with the first processor, the pulse generator transmitting a first hardware pulse to the at least one second processor at the future time and transmitting subsequent hardware pulses from the first processor to the at least one second processor at the periodic interval, wherein data message communications between the first processor and the at least one second processor are operable between the first hardware pulse and the subsequent hardware pulses and between the subsequent hardware pulses.

32. The system of claim 31, wherein the first timekeeper is capable of multicasting the at least one data message to the at least one second processor.

33. The system of claim 31, wherein the pulse generator is capable of multicasting the first and subsequent hardware pulses from the first processor to the at least one second processor.

34. The system of claim 31, wherein the first timekeeper is capable of receiving time data.

35. The system of claim 31, wherein the first timekeeper is capable of receiving time data from one of the first clock, a global positioning system (GPS) receiver, and a radio timecode receiver.

36. A system to receive time data from a first processor, the system comprising:
a second processor including
a second clock, and
a second timekeeper for receiving at least one data message that associates a hardware pulse with a future time and with a periodic interval, receiving a first hardware pulse sent from the first processor at the future time, receiving subsequent hardware pulses from the first processor at the periodic interval, wherein data message communications from and to the first processor are operable between the first hardware pulse and the subsequent hardware pulses and between the subsequent hardware pulses, and associating the hardware pulse with the future time.

37. The system of claim 36, wherein the second timekeeper is capable of adjusting the second clock based on the future time.

* * * * *